United States Patent
Sanusi et al.

(10) Patent No.: US 11,746,713 B2
(45) Date of Patent: Sep. 5, 2023

(54) FUEL CONTROL SYSTEM

(71) Applicant: ROLLS-ROYCE plc, London (GB)

(72) Inventors: Ibrahim Sanusi, Derby (GB); Andrew R Mills, Derby (GB); Derek S Wall, Derby (GB)

(73) Assignee: ROLLS-ROYCE PLC, London (GB)

( * ) Notice: Subject to any disclaimer, the term of this patent is extended or adjusted under 35 U.S.C. 154(b) by 495 days.

(21) Appl. No.: 16/794,620

(22) Filed: Feb. 19, 2020

(65) Prior Publication Data

US 2020/0284207 A1  Sep. 10, 2020

(30) Foreign Application Priority Data

Mar. 7, 2019  (GB) .................................... 1903062

(51) Int. Cl.
*F02C 9/52* (2006.01)
*F02C 9/54* (2006.01)

(52) U.S. Cl.
CPC .................. *F02C 9/52* (2013.01); *F02C 9/54* (2013.01); *F05D 2270/30* (2013.01); *F05D 2270/303* (2013.01); *F05D 2270/44* (2013.01)

(58) Field of Classification Search
CPC .......... F02C 9/52; F02C 9/54; F05D 2270/30; F05D 2270/303; F05D 2270/44
See application file for complete search history.

(56) References Cited

U.S. PATENT DOCUMENTS 7,853,392 B2  12/2010  Healey et al.
8,740,548 B2  6/2014  Rowe et al.
(Continued)

FOREIGN PATENT DOCUMENTS

EP  2148044 A2  1/2010

OTHER PUBLICATIONS

Chachuat, B. et al., "Adaptation strategies for real-time optimization," Computers & Chemical Engineering, available online on May 9, 2009, vol. 33, Issue 10, pp. 1557-1567.
(Continued)

*Primary Examiner* — Arun Goyal
*Assistant Examiner* — William L Breazeal
(74) *Attorney, Agent, or Firm* — Oliff PLC

(57) ABSTRACT

A control system of a gas turbine engine is provided. The engine has a fuel flow metering valve which regulates a fuel flow to the engine, and one or more variable geometry components which are movable between different set points to vary an operating configuration of the engine. The control system has an engine fuel control sub-system which provides a fuel flow demand signal for controlling the fuel flow metering valve. The control system further has a variable geometry control sub-system which determines current set points to be adopted by the variable geometry components given the current engine operating condition in order to comply with one or more engine constraints. The control system further has an optimiser that receives the current set points and determines adjusted values of the set points which optimise, while complying with the engine constraints, an objective function modelling a performance characteristic of the engine, the objective function adapting to change in engine performance with time. The control system further has a feedback loop in which the adjusted values of the set points thus-determined are sent to the variable geometry control sub-system to vary the current set points.

12 Claims, 6 Drawing Sheets

(56) References Cited

U.S. PATENT DOCUMENTS

| | | | |
|---|---|---|---|
| 2004/0123600 A1 | 7/2004 | Brunell et al. | |
| 2008/0243352 A1 | 10/2008 | Healy | |
| 2010/0017093 A1 | 1/2010 | Mahmood | |
| 2010/0021285 A1 | 1/2010 | Rowe et al. | |
| 2011/0301822 A1 | 12/2011 | Aurousseau | |
| 2012/0215417 A1* | 8/2012 | Boyer | F02C 9/22 |
| | | | 701/100 |
| 2012/0269613 A1* | 10/2012 | Mills | F02C 7/057 |
| | | | 415/48 |
| 2013/0255221 A1 | 10/2013 | Gaully et al. | |
| 2014/0260312 A1 | 9/2014 | Davis, Jr. et al. | |
| 2016/0069277 A1 | 3/2016 | Meisner et al. | |
| 2016/0146119 A1 | 5/2016 | Furukawa et al. | |
| 2016/0341066 A1* | 11/2016 | Coffey | F02C 9/22 |
| 2018/0050809 A1* | 2/2018 | Colavincenzo | B64D 31/12 |
| 2018/0216535 A1* | 8/2018 | Hill | F02C 7/16 |

OTHER PUBLICATIONS

Search Report of the Intellectual Property Office of the United Kingdom for GB1903062.6 with search date of Sep. 9, 2019.
Jul. 21, 2020 extended Search Report issued in European Patent Application No. 20157727.7.

* cited by examiner

FUEL CONTROL SYSTEM

CROSS-REFERENCE TO RELATED APPLICATIONS

This specification is based upon and claims the benefit of priority from United Kingdom patent application number GB 1903062.6 filed on Mar. 7, 2019, the entire contents of which are incorporated herein by reference.

BACKGROUND

Field of the Disclosure

The present disclosure relates to engine control systems, particularly for gas turbine engines having one or more variable geometry components.

Description of the Related Art

A purpose of an engine fuel control system is to provide an engine with fuel in a form suitable for combustion and to control the rate of fuel flow for accurate control of engine speed and acceleration. It is known to control the thrust of a gas turbine engine using an Electronic Engine Control (EEC), the thrust of the engine being indirectly measured using shaft speed, Engine Pressure Ratio (EPR) or Turbine Power Ratio (TPR). The EEC also controls (i) the shaft speeds within safe operational limits, and (ii) the temperature and pressure at different parts of the engine to avoid undesirable conditions such as surge or stall, and to ensure the integrity of the engine. Environmental considerations as well as growing power demands of modern aircraft require control systems that are robust and optimised to the operating conditions of the aircraft.

Electronic closed-loop fuel control systems have an integrating action which helps to ensure accurate control of the engine while meeting the pilot's demands for thrust and complying with safety limits. Such systems offer distinct advantages in the achievement of accurate acceleration control under normal operating conditions.

The architecture of one such engine fuel control system, known as the Rolls-Royce Inverse Model (RRIM) is shown in FIG. 1. It is also described in United States patent application US 2010/017093 A1.

In the RRIM, fuel flow to the engine is controlled by a fuel flow metering valve in response to an aggregate fuel flow demand signal. This signal comprises an element computed in accordance with instantaneous engine speed and an overfuelling element computed in accordance with a pilot's thrust or speed demand ($NH_D$).

The system of FIG. 1 employs a first control loop 1, which is shown having a generic control error circuit 2. Signal "$y_r$" (which in practice would correspond to a given thrust or speed demand) into circuit 2 is a vector of the reference values of controlled engine outputs and signal "y" is the vector of the actual values of those controlled outputs. Variable gain 81 acts on the error output e(t) of circuit 2. The overfuelling requirement $\Delta Wf$ generated by the control loop 1 is produced when the $NHdot_D$ signal which outputs from variable gain 81 is multiplied at 72 with a $(\Delta Wf/NHdot)^*$ value (see below).

An estimated engine steady state fuel flow requirement Wfss* is computed by engine inverse model block 3 of second (feedback) loop generally indicated at 4, and this signal is arithmetically summed to the overfuelling requirement $\Delta Wf$ at summing junction 5. The aggregate fuel flow demand signal Wf(t) is supplied to one input of a lowest wins logic block for comparison with a maximum fuel flow signal. A further minimum fuel flow limit signal is compared with the output of block by a highest wins comparison. The resulting trimmed aggregate fuel flow demand signal, WFE, then controls operation of the fuel flow metering valve which regulates the flow of fuel to the engine.

The Wfss* versus NH* characteristic of engine inverse model block 3 can be modified by input signals (temperature, pressure, air bleed, guide vanes etc.) to select the most appropriate member of a family of characteristics and to scale or correct the selected member in order to compensate for the changes in operating conditions.

The feedback loop 4 of the RRIM receives $Wf_{IM}$, where the subscript indicates a general fuel flow feedback input to the inverse model. For example, that input can be the fuel flow demand, Wf(t), rather than the trimmed fuel signal as fed to the fuel flow metering valve. The RRIM subtracts from the fuel flow feedback at summer junction 6 the estimated steady state fuel signal Wfss*. The difference is then multiplied at 8 by the estimated rate of change of engine speed with fuel increment $(NHdot/\Delta Wf)^*$ to provide an estimate of engine acceleration dNH*/dt. The value for $(NHdot/\Delta Wf)^*$ comes from a subsidiary loop which generates $(NHdot/\Delta Wf)^*$ as a function of the estimate of the engine's speed NH* produced by integrator 7. More specifically, the value for NH* is passed from the integrator 7 to a second engine model block 70, which generates the value for $(NHdot/\Delta Wf)^*$. Similarly to the first engine inverse model block 3, the $(NHdot/\Delta Wf)^*$ versus NH* characteristic of block 70 can be modified by input signals (temperature, pressure, air bleed, guide vanes etc.) to select the most appropriate member of a family of characteristics. The $(NHdot/\Delta Wf)^*$ value generated by engine model block 70 is also inverted at inverter 71 to produce the $(\Delta Wf/Nhdot)^*$ value, which is multiplied with the $NHdot_D$ signal at 72 to provide the overfuelling requirement $\Delta Wf$ sent to summing junction 5.

The dynamics of the RRIM are tuned to the requirements of the engine via the data within nonlinear modules, $f_B$ and $f_A$, of the first 3 and second 70 engine model blocks respectively. The data within these tables can be calculated using an elaborate engine model which relates the output NH(s) to the input Wf(s), where "s" is the Laplace complex variable. Nonlinear module $f_A$ which is a piecewise continuous function is responsible for the high frequency gain of this relationship and nonlinear module $f_B$ which is a differentiable function contains the inverted static process characteristic of the engine regarding fuel flow to NH. The state of the control system models NH and is input to nonlinear modules $f_A$ and $f_B$. The aggregate fuel flow demand signal, Wf(t), is a summation of the steady state fuel flow requirement associated with NH*(t), Wfss*, and the incremental fuel flow demand, $\Delta Wf$, required to fulfil the acceleration demand $NHdot_D$. The acceleration demand reduces to zero and the NH* approaches to NH as the control error reduces to zero due to the integral action within the RRIM.

The variable geometry components of the engine, such as the variable inlet guide vanes, operate between fixed low speed positions (closed position) and high speed positions (open position) to maintain optimum angle of attack on the compressor blades, and maintain system stability. In particular, the vanes are moved in response to system conditions to create adequate safe margins from surge, stall and other undesirable compressor conditions. The steady-state vane positions can be determined by set-point schedules which are designed to provide efficient operation of the engine whilst also providing safe margins for worst case system conditions for the entire life of the engine.

The most efficient set-point for a given variable geometry and the safety constraints on that set-point are affected by engine power setting, compressor boundary conditions (such as inlet temperature, flow, pressure etc.), amount of air bleed, degradation of engine health state and engine-to-engine variation. In general, only a subset of these are measurable, and the relationship between measurable variables and variable geometry effect on the system is time-varying and unpredictable. Conventionally, schedules accept shaft speeds, pressures and temperatures and use physics-based calculations for a nominal engine behaviour to determine the best-set points. However, the calculations are not responsive to changes in the system behaviour.

In particular, degradation of engine health state and engine-to-engine variation make it difficult to determine in advance optimum control laws for the positions of variable geometry components of an engine.

An aim of the present disclosure is to better optimise the variable geometry components' positions whilst respecting stability constraints.

SUMMARY

According to a first aspect there is provided a control system of a gas turbine engine having a fuel flow metering valve which regulates a fuel flow to the engine, and one or more variable geometry components which are movable between different set points to vary an operating configuration of the engine, the control system having:

an engine fuel control sub-system which provides a fuel flow demand signal for controlling the fuel flow metering valve; and a variable geometry control sub-system which determines current set points to be adopted by the variable geometry components given the current engine operating condition in order to comply with one or more engine constraints;

wherein the control system further has an optimiser that receives the current set points and determines adjusted values of the set points which optimise, while complying with the engine constraints, an objective function modelling a performance characteristic of the engine, the objective function adapting to change in engine performance with time; and wherein the control system further has a feedback loop in which the adjusted values of the set points thus-determined are sent to the variable geometry control sub-system to vary the current set points.

The optimised set-points can thus be unique to a specific engine, which enables the system to accommodate differences of build and age between different engines. In addition, splitting responsibility for fuel control and variable geometry control between the engine fuel control sub-system and a separate variable geometry control sub-system allows the overall control system to use a conventional engine fuel control sub-system, such as the RRIM. Advantageously, this reduces the certification burden of the control system, since the primary fuel control loop can remain unchanged allowing certification of the loop to exploit existing certification evidence. In other words, providing the engine constraints are respected, the engine fuel control sub-system allows a pilot's thrust demand to be met independently of the variable geometry components.

According to a second aspect there is provided a gas turbine engine for an aircraft comprising: a fuel flow metering valve which regulates a fuel flow to the engine, one or more variable geometry components which are movable between different set points to vary an operating configuration of the engine; and a control system according to any one of the previous claims.

Optional features of the present disclosure will now be set out. These are applicable singly or in any combination with any aspect of the present disclosure.

The variable geometry control sub-system may contain one or more set point schedules for the variable geometry components, the schedules determining the current set points to be adopted by the variable geometry components given the current engine operating condition in order to comply with the engine constraints. The variable geometry control sub-system can then further include one or more variable offsets which tune the set point schedules; and the adjusted values of the set points can be sent to the variable geometry control sub-system to vary the current set points by varying the offsets. Thus although the schedules may be fixed and identical for a given engine type within a production standard, by varying their respective offsets, engine-to-engine variation can be produced.

The fuel flow demand signal may be an aggregate fuel flow demand signal, the engine fuel control sub-system including: a summing junction which generates the aggregate fuel flow demand signal by summing a first output signal which converges on a steady state fuel flow requirement value, and an overfuelling demand signal which is derived from a thrust or speed demand signal; and a further feedback loop which generates the first output signal in response to the aggregate fuel flow demand signal.

The performance characteristic modelled by the objective function may be any one of, or any combination of two or more of: engine specific fuel consumption, engine life, engine emissions and engine temperature. Further the objective function may vary over a given engine mission, e.g. optimising specific fuel consumption at one part of the mission and engine emissions at another part of the mission.

The objective function may model the performance characteristic as a function of variables which include: the set points of the variable geometry components, and a trim variable indicative of engine power output. For example, the trim variable can be the demanded fuel flow provided by the engine fuel control sub-system, or it can be a related measurable variable such as a turbine pressure ratio or a shaft speed.

The one or more variable geometry components may include either or both of: one or more sets of compressor variable inlet guide vanes and one or more sets of compressor bleed valves.

The one or more engine constraints may include any or more of: one or more compressor surge margins, one or compressor stall margins, and one or more compressor pressure ratios.

The control system may be configured to temporarily discontinue use of the optimiser and the feedback loop during engine transient manoeuvres.

The control system may be part of an on-board, electronic engine controller.

According to a third aspect there is provided a method of controlling a gas turbine engine having a fuel flow metering valve which regulates a fuel flow to the engine, and one or more variable geometry components which are movable between different set points to vary an operating configuration of the engine, the method including repeatedly performing the steps of:

providing a fuel flow demand signal for controlling the fuel flow metering valve;

determining current set points to be adopted by the variable geometry components given the current engine operating condition in order to comply with one or more engine constraints;

determining adjusted values of the set points which optimise, while complying with the engine constraints, an objective function modelling a performance characteristic of the engine, the objective function adapting to change in engine performance with time; and using the adjusted values of the set points thus-determined to vary the current set points.

The method of the third aspect thus corresponds to the system of the first aspect. Accordingly, optional features of the first aspect apply also to the method of the third aspect.

According to a fourth aspect there is provided a computer program comprising code for optimising the operation of a gas turbine engine having a fuel flow metering valve which regulates a fuel flow to the engine, and one or more variable geometry components which are movable between different set points to vary an operating configuration of the engine, the code, when run on a computer, causing the computer to perform the method of the third aspect.

According to a fifth aspect there is provided a computer readable medium storing the computer program according to the fourth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds) for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 2:
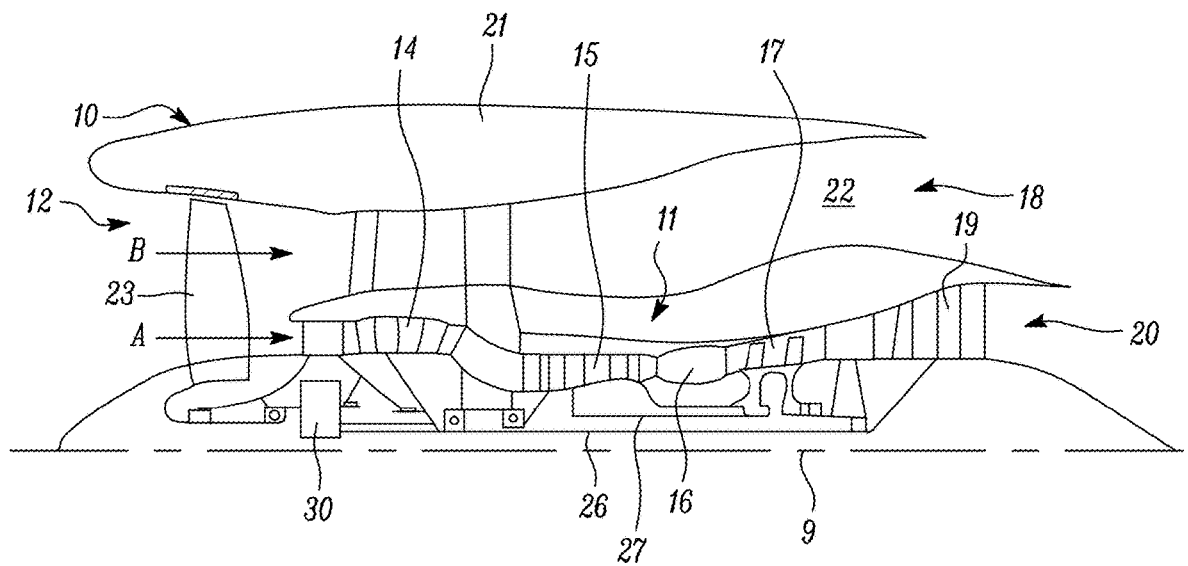
FIG. 2 is a sectional side view of a gas turbine engine.

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

An exemplary arrangement for a geared fan gas turbine engine 10 is shown in FIG. 2. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
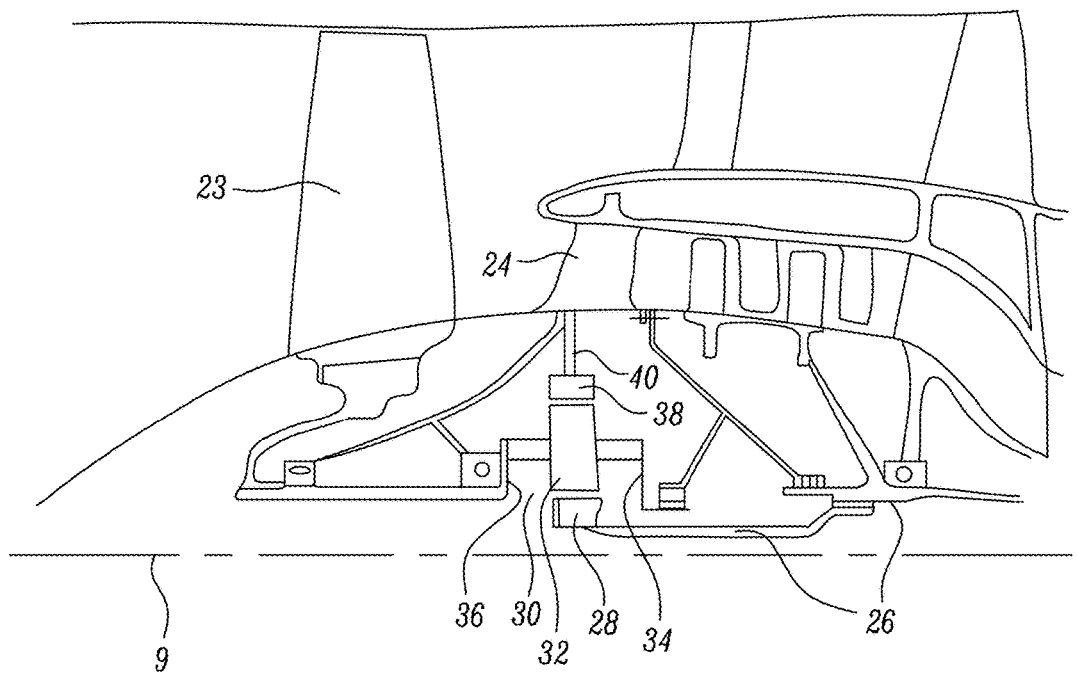
FIG. 3 is a close up sectional side view of an upstream portion of a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

Figure 4:
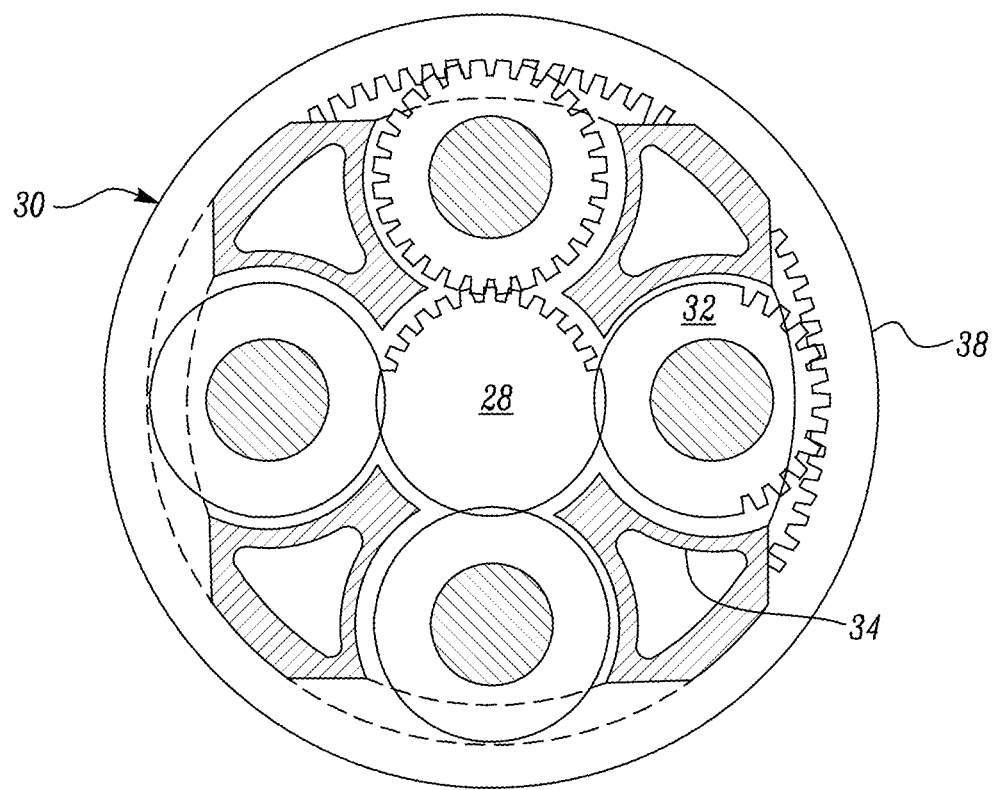
FIG. 4 is a partially cut-away view of a gearbox for a gas turbine engine.

The epicyclic gearbox 30 illustrated by way of example in FIG. 3 and FIG. 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 3), and a circumferential direction (perpendicular to the page in the FIG. 2 view). The axial, radial and circumferential directions are mutually perpendicular.

Figure 1:
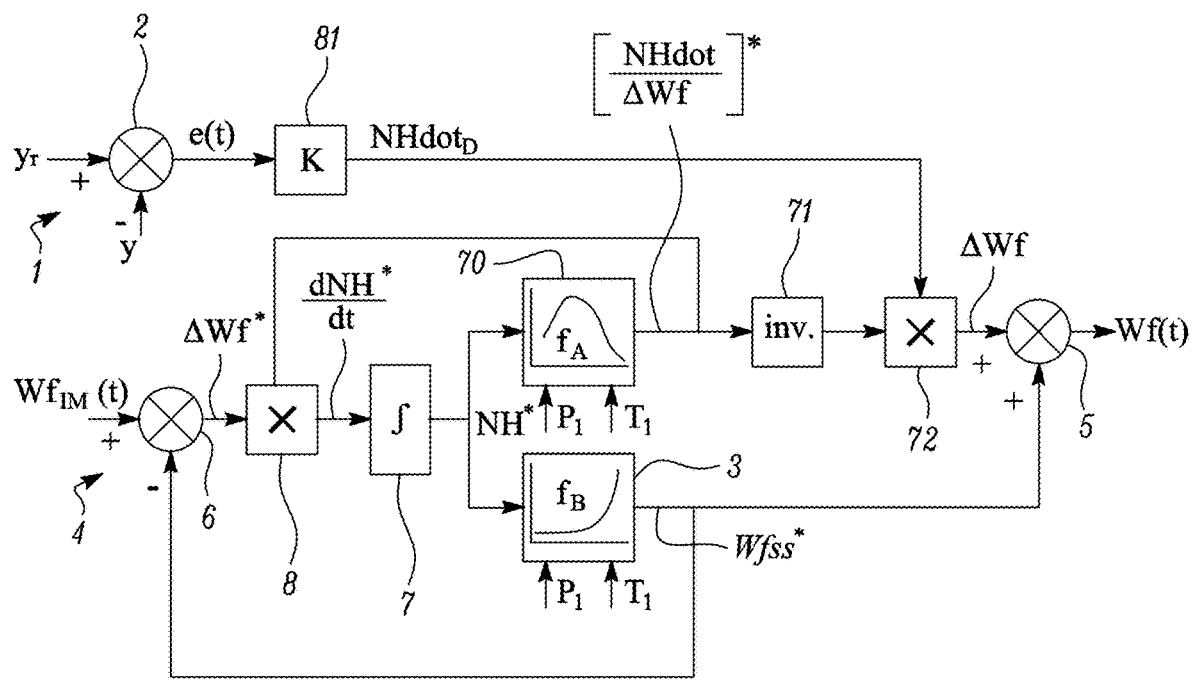
FIG. 1 shows schematically architecture of an engine fuel control system.
Figure 5:
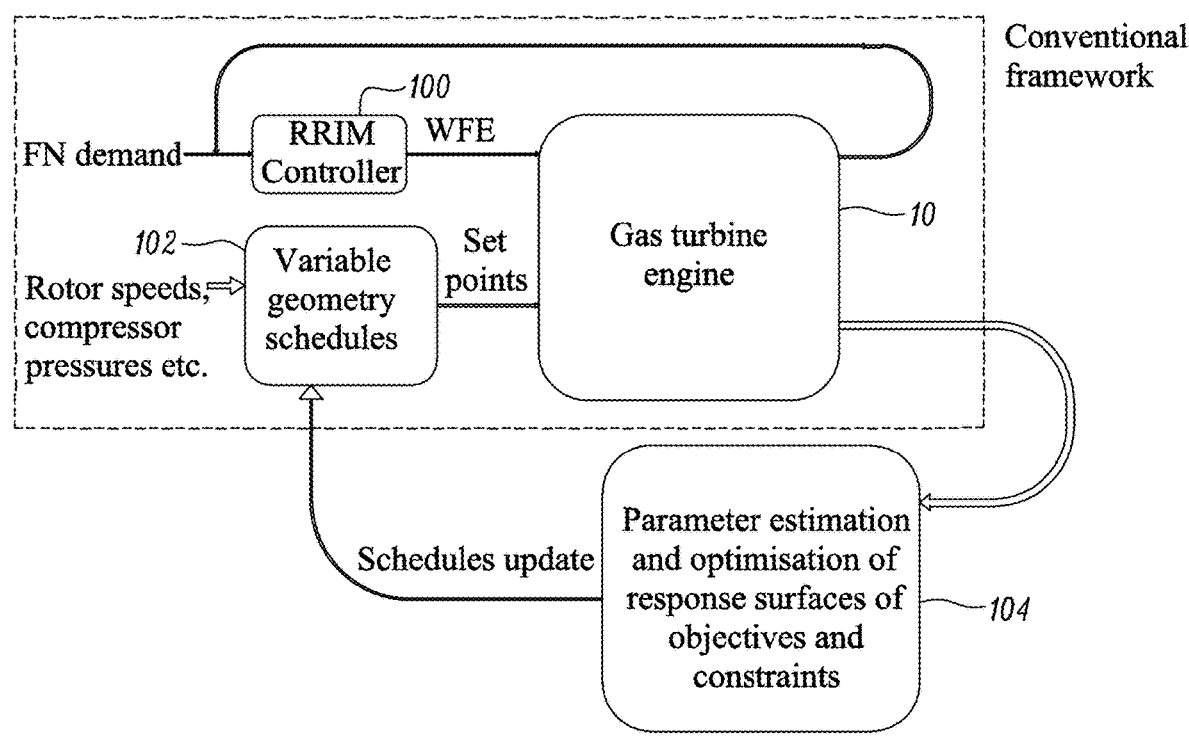
FIG. 5 shows an overview of a control system of the engine of FIGS. 2 to 4.

As shown schematically in FIG. 5, the gas turbine engine 10 has an EEC which provides a fuel control sub-system 100, of the type described above in relation to FIG. 1, to control the fuel flow delivered to the combustion equipment 16 by a fuel flow metering valve of the engine.

The engine 10 also has variable geometry components, such as low pressure compressor variable inlet guide vanes (LP VIGVs), a high-pressure compressor variable inlet guide vanes (HP VIGVs), which operate between fixed low speed positions (closed position) and high speed positions (open position) to maintain appropriate angles of attack on the compressor blades, and maintain system stability. The movement of the vanes is responsive to system conditions (engine rotor speeds, compressor pressures and/or altitude) under the control of a variable geometry control sub-system 102 of the EEC, and creates adequate safe margins from surge, stall and other undesirable compressor conditions. Specifically, the sub-system 102 has set point schedules which determine steady-state vane positions designed to provide safe margins for worst case systems conditions for the entire life of the engine. Providing the constraints imposed by these margins are met, closed loop control of thrust by fuel control sub-system 100 determines the required fuel flow to meet the pilot's thrust demand (FN), independently of the variable geometry components.

The EEC also has an optimiser 104 (described in more detail below) that receives the current set points and determines adjusted values of the set points which optimise, while complying with the engine constraints, an objective function modelling a performance characteristic of the engine, the objective function adapting to change in engine performance with time. More particularly, engine measurements from the engine 10, such as shaft speeds, temperatures, and engine pressure ratios, are used to give estimates of the achieved parameters: engine thrust, specific fuel consumption (SFC) and surge margin (SM) magnitudes. The desired cost function (e.g. SFC, engine life, emissions, temperature, or combinations of these and other attributes) and system operational constraints are modelled as functions of a trim variable, the LP VIGV set point and the HP VIGV set point, using the engine measurements, the trim variable being an indicator of engine power output. One option for the trim variable is the WFE, but other possible trim variables which can be used by the optimiser are a measured turbine pressure ratio or a measured shaft speed (e.g. the LP shaft speed). The model is used in an optimisation scheme to determine the VIGV set points that minimise the cost function while satisfying the engine constraints. Feedback from the optimiser then updates the set point schedules of the sub-system 102 over a range of flight conditions and engine life.

The optimiser 104 and its feedback may be used only during steady state operation of the engine. In particular, as a precaution to guarantee adequate SM magnitudes, during transient manoeuvres their use may be discontinued and the set points determined solely by the un-updated (conventional) schedules.

Conveniently the updating is achieved by varying offsets which tune the set point schedules. Thus although the schedules may be fixed and identical for a given engine type within a production standard, by varying their respective offsets, engine-to-engine variation can be produced. The optimiser takes advantage of this by adapting its model to account for differences between build and age of engine so that the updated set points are unique to a given engine at a given time.

This approach to fuel control and set point determination for the variable geometry components can allow the continued use of conventional thrust demand control loops, such as the RRIM. Advantageously, this reduces the certification burden of the control system, since the primary fuel control loop can remain unchanged allowing certification of the loop to exploit existing certification evidence. Related to this, the approach can maintain guarantees on thrust control response whilst nonetheless reducing fuel consumption.

Figure 6:
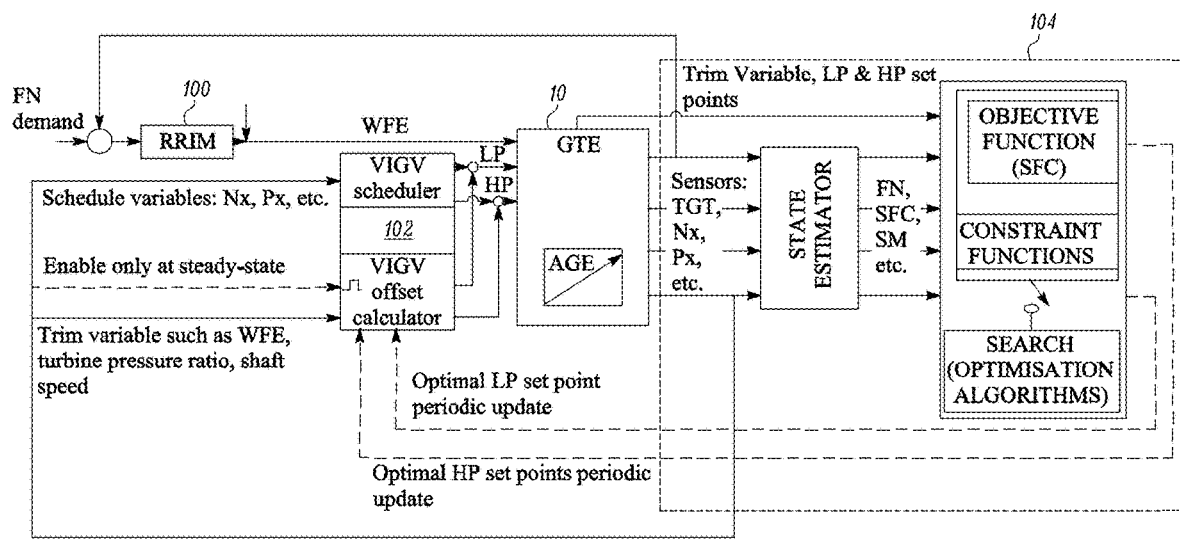
FIG. 6 shows more detail of the control system of FIG. 5.

Another schematic, showing more detail of the optimiser 104 is shown in FIG. 6. During operation, the fuel control sub-system 100 in response to a demanded thrust FN computes the required fuel flow WFE, while set points for the corresponding LP and HP VIGV angles as-determined by a VIGV scheduler of the variable geometry control sub-system 102 are tuned according to offsets determined by an offset calculator of the variable geometry control sub-system. The optimiser 104 uses both objective and constraint models, which are response surfaces between control inputs (trim variable, VIGV, . . . ) and objectives (SFC, . . . ) and constraints (SM, . . . ). These are adapted to gradual engine deterioration over time, and the effect of degradation recovery actions such as compressor wash and routine maintenance. A test signal may be periodically injected into the variable geometry to excite the system allowing the behaviour of the system to be measured and updated.

Suitable model structures for the response surface models can be selected from offline system analysis of input/output data from the gas turbine engine. Engine deterioration causing the engine operating points to change with time can be reflected in the parameters of the response surface models. For example, adaptation of the models in an online setting can be achieved using a Kalman filter framework that is able to successively track both the objective and constraints parameters using new engine measurements. Other approaches, however, can also be used. A search (optimisation) process is performed using the adapted engine response models to determine both optimal and feasible set-points of vane angle, for given fuel flow settings determined by the conventional thrust controller feedback loop.

The optimisation can be performed using conventional optimisation algorithms. Indeed, the ability to use many types of optimiser allows the response surfaces to incorporate non-linear relations, non-convex constraints and/or multi-modal surfaces. In general, the model structures are simplified off-line to enable simpler optimisation techniques to be applied on-board with stronger convergence guarantees.

An off-line variant is possible where measurements are transferred to a ground based station, where model building and optimisation, as per the above description, are performed to generate an optimised schedule that may be uploaded to the engine. Information from a fleet of engines can be incorporated in the model building.

The criteria selected for optimisation by the objective function (SFC, life, emissions, engine temperature etc.) may be dynamically weighted to reflect different needs at different operating envelope points, routes, operators, or economic climates.

Further details of the variable geometry control sub-system 102 and the optimiser 104 are provided in the following sections.

Response Surface

The main function of an engine controller is to generate thrust in response to a pilot or autopilot demand. Core gas turbine engine sensor measurements used for engine performance and monitoring purposes are usually the shaft speed measurements (NL and NH, and also NI in the case of a three-shaft engine), pressure measurements such as P30, engine pressure ratio measurements, and temperature measurements (e.g. T30, T41, T40 and T44). The achieved thrust, SFC and SM can be calculated from these engine measurements.

Variable engine components such as vane angles are controlled through scheduling, which is feed-forward controlled from rotor speeds, compressor pressures and altitude, with transition from open to increasingly closed over acceleration or deceleration. The schedules are designed to reduce SFC at a given operating point but also to be conservative in the set points to maintain safe operation.

Thus these movements of the vanes are responsive to system conditions and create adequate safe margins for surge margins and other undesirable compressor conditions.

These undesirable compressor conditions could include temperature, pressure and air system driving pressure ratio limits for safety reasons, shaft speed limitations to preserve component life, and thrust limitations for safety and aircraft controllability reasons.

Engine deterioration (aging) causes the engine operating points to change gradually, and the optimisation scheme continually identifies the optimal/feasible set points for the variable guide vanes and controller parameters.

Figure 7:
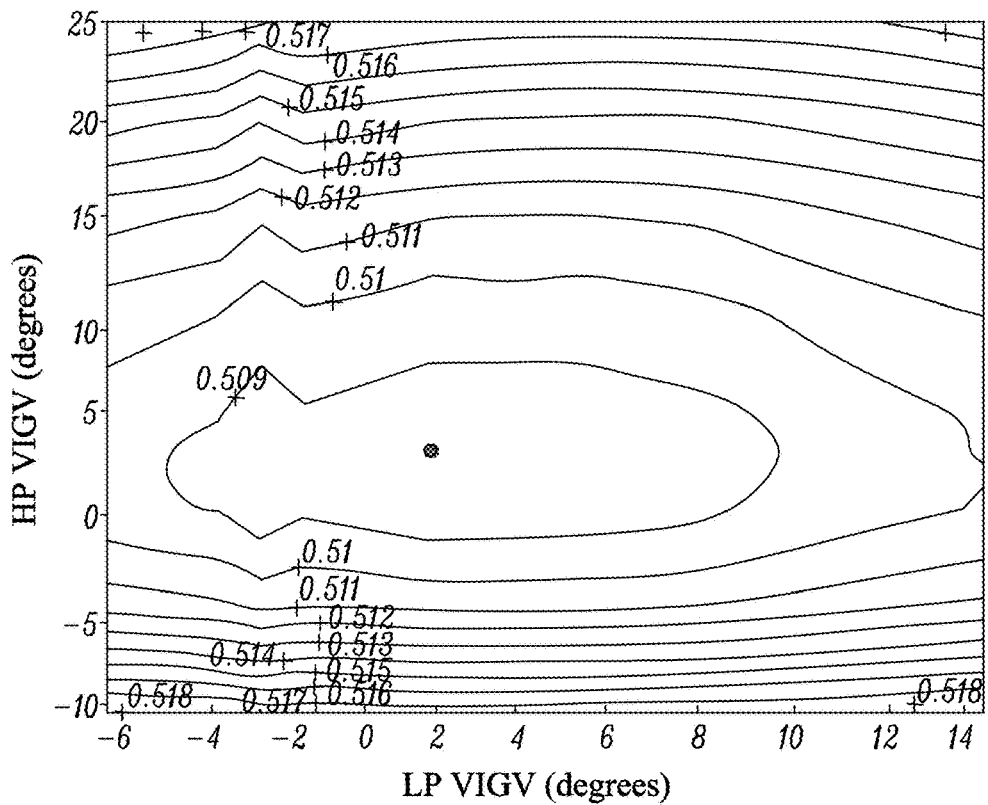
FIG. 7 show an example contour plot of SFC as it varies with VIGV angles at a given fuel flow setting and a given engine degradation cycle.

FIG. 7 show a typical example contour plot of the objective (SFC) as it varies with VIGV angles of an engine (actually a three shaft engine having HP and intermediate pressure (IP) VIGVs, but similar plots are obtained for the LP and HP VIGVs of the engine of FIGS. 2 to 4) at a given fuel flow setting (i.e. trim variable) and a given engine degradation cycle. The SFC surface is rather convex, with monotonically decreasing contour lines, and this general shape is preserved for other fuel flow settings and engine degradation cycle. This property can thus be further explored in the optimisation framework.

Figure 8:
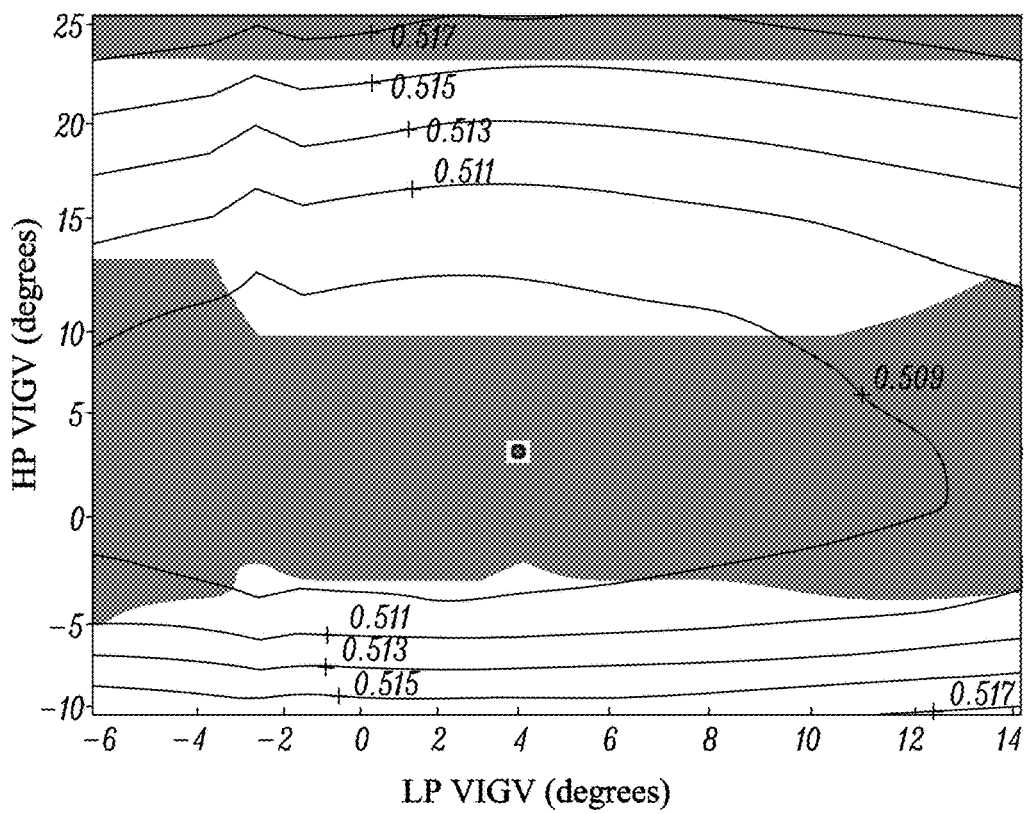
FIG. 8 shows feasible (not shaded) and infeasible (shaded) regions created by constraints on a different SFC contour plot.

FIG. 8 shows feasible (not shaded) and infeasible (shaded) regions created by the constraints on a different contour plot of SFC as it varies with VIGV angles at a given fuel flow setting and a given engine degradation cycle. In general, there are few constraint violations at the start of the engine cycle, and operating at minimum fuel flow setting, at cruise conditions. However, as the controller fuel flow setting is increased to the maximum level and as the engine deteriorates with further cycles the constraint violations can create the bifurcation in the feasible operating regions shown in FIG. 8. This poses a challenge to the optimisation problem.

Modelling

In order to be able to optimise SFC (or other criterion) through the required fuel flow and the variable guide vane adjustments in the real-time optimisation compressor scheme, models of SFC and system operational constraints, as functions of the controller settings (trim variable, LP and HP VIGV) are determined. In the following discussion, WFE is used as the trim variable.

These models are used in an optimisation scheme in which the decision variables are LP VIGV and HP VIGV. The fuel flow setting WFE is determined by the RRIM controller 100. The objective function can therefore be formulated as:

SFC=function(WFE,LP,HP)

The system operational constraints which are the restrictions on the values that can be assigned to the decision variables are also modelled via mathematical expressions as the constraint functions. Typical system operational constraints are:

LP surge margin limit (%)
HP surge margin limit (%)
HP nozzle guide vane (NGV) air system driving pressure ratio limit (P30/P40)
HPT inter-stage cavity air system driving pressure ratio limit
HPT rear cavity air system driving pressure ratio limit
LPT front cavity air system driving pressure ratio limit Investigations show that, with X as the decision variable vector, SFC can be modelled as a quadratic (2nd degree polynomial model) function given as:

$$S\hat{F}C = [LP\ HP\ WFE]\begin{bmatrix} a_{11} & a_{12} & a_{13} \\ a_{21} & a_{22} & a_{23} \\ a_{31} & a_{32} & a_{33} \end{bmatrix}\begin{bmatrix} LP \\ HP \\ WFE \end{bmatrix} + [b_1\ b_2\ b_3]\begin{bmatrix} LP \\ HP \\ WFE \end{bmatrix} + c$$

$$S\hat{F}C = X^T AX + BX + C$$

With the decision variables (WFE, LP and HP) independent of one another, and therefore ignoring cross-product terms, SFC can then be modelled as a second order polynomial function using only the main/linear terms and the quadratic effect terms as given by:

$$f(\underline{x}) = \beta_0 + \beta_1\underline{x} + \beta_2\underline{x}^2 + \varepsilon$$

Where $\beta_1$ are the linear effect parameters, and $\beta_2$ are the quadratic effect parameters. This reduces the number of unique terms to be estimated to only seven and reduces the risk of collinearity which is caused by having too many variables for estimation.

Performance objective and constraint functions can then be modelled as a quadratic (second-order) polynomial model given by:

$$\therefore f(\underline{X}) = a_{11}LP^2 + a_{22}HP^2 + a_{33}WFE^2 + b_1LP + b_2HP + b_3WFE + c$$

Parameters of the polynomial model can be determined using the least squares estimates by minimising the sum of the squares of the estimate residuals. The best values for each of the parameters are therefore determined by formulating the sum of the squares of the residuals, $S_r$, as:

$$\therefore \underline{S}_r = \sum_{i=1}^n (y_i - \{c + b_1LP + a_{11}LP^2 + b_2HP + a_{22}HP^2 + b_3WFE + a_{33}WFE^2\})^2 \equiv$$

$$\underline{S}_r = Y - \Phi\beta$$

$$\text{where: } \beta = \begin{bmatrix} c \\ b_1 \\ a_{11} \\ b_2 \\ a_{22} \\ b_3 \\ a_{33} \end{bmatrix}, \Phi = \begin{bmatrix} 1 & LP_1 & LP_1^2 & HP_1 & HP_1^2 & WFE_1 & WFE_1^2 \\ 1 & LP_2 & LP_2^2 & HP_2 & HP_2^2 & WFE_2 & WFE_2^2 \\ \vdots & \vdots & \vdots & \vdots & \vdots & \vdots & \vdots \\ \vdots & \vdots & \vdots & \vdots & \vdots & \vdots & \vdots \\ n & LP_n & LP_n^2 & HP_n & HP_n^2 & WFE_n & WFE_n^2 \end{bmatrix},$$

$$Y = \begin{bmatrix} y_1 \\ y_2 \\ \vdots \\ \vdots \\ y_n \end{bmatrix}$$

The optimal values using least squares are given as:

$$\hat{\beta} = ((\Phi^T\Phi)^{-1}\Phi^T Y$$

Optimisation Algorithm

Optimisation algorithms differ in the choice of step length and search direction. As real-time compressor management optimisation can include non-convex constraints, algorithms that can handle both convex and non-convex constraints are preferred. For example, these include: gradient based augmented lagrangian multiplier, interior point, sequential quadratic programming and conservative convex separable approximation methods. Other possibilities are derivative-free local search methods such as constrained optimisation by linear approximations (COBYLA) and direct grid search methods.

Recursive Estimation of Time-Varying Measurements

Engine deterioration (aging) causes the engine operating points to change with time. This engine variation can be reflected in the parameters of the engine models. Adapting the parameters of a system model to slow variations in system dynamics is therefore desired in an online situation with continuous new observations. Algorithms such as the recursive least squares (RLS) with forgetting factor which is a special case of a simple local regression model with varying coefficients have been proposed in and reported to be superior to the classical RLS method. Numerous literatures have equally reported other variations of the RLS algorithm to handle situations where the variations in the coefficients are time-varying. These situations can be handled by using the RLS algorithm with a vector forgetting factor or by using the Kalman filter. With specific assumptions about the covariance matrix of the parameter variations, it can be shown easily that the RLS algorithm is a special case of the Kalman filter. The Kalman filter is well known to be an optimal estimator among all linear estimators, in the sense that it produces estimates with the minimum conditional estimation error covariance under assumptions. Being optimal, the Kalman filter is able to produce the most statistically accurate estimates of the time-varying parameters, and generally outperforms the RLS algorithms.

A Kalman filter framework is able to achieve the following:

Successive update and tracking of the second-order polynomial model with new measurements to reflect system model deterioration over time.

Overcome the problem of ill-conditioning from attempting to fit a model to less spread of data each time.

The objective and constraint function models can thus be represented using a simple second-order polynomial model, and a Kalman filter framework for gradual adaptation of the models as the engine evolves over time. These system models can then be used in an optimisation framework to determine the controller VIGV set points that give the optimal SFC, and within acceptable system operational limits as the engine evolves over time.

Other Matters

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A control system of a gas turbine engine having a fuel flow metering valve which regulates a fuel flow to the gas turbine engine, and one or more variable geometry components which are movable between different set points to vary an operating configuration of the gas turbine engine, the control system comprising:

an engine fuel control sub-system configured to provide a fuel flow demand signal for controlling the fuel flow metering valve;

a variable geometry control sub-system configured to determine current set points to be adopted by the one or more variable geometry components given a current engine operating condition in order to comply with one or more engine constraints;

an optimiser configured to receive the current set points, determine adjusted values of the set points which optimise, while complying with the one or more engine constraints, an objective function modelling a performance characteristic of the gas turbine engine, the objective function configured to adapt to a change in engine performance with time, and adjust values of the set points, thereby generating adjusted values of the set points that account for differences between a plurality of different gas turbine engines, including the gas turbine engine, so that the adjusted values of the set points are specific to the gas turbine engine at a given time; and a feedback loop in which the adjusted values of the set points determined by the optimiser are configured to be sent to the variable geometry control sub-system to vary the current set points.

2. The control system according to claim 1, wherein:

the variable geometry control sub-system contains one or more set point schedules for the one or more variable geometry components, the one or more set point schedules determining the current set points to be adopted by the one or more variable geometry components given the current engine operating condition in order to comply with the one or more engine constraints;
the variable geometry control sub-system further includes one or more variable offsets for tuning the one or more set point schedules; and
the variable geometry control sub-system is configured to receive the adjusted values of the set points to vary the current set points by varying the one or more variable offsets.

3. The control system according to claim 1, wherein the performance characteristic modelled by the objective function is any one of, or any combination of two or more of: engine specific fuel consumption, engine life, engine emissions and engine temperature.

4. The control system according to claim 1, wherein the objective function models the performance characteristic as a function of variables which include: the set points of the one or more variable geometry components, and a trim variable indicative of engine power output.

5. The control system according to claim 4, wherein the trim variable is the demanded fuel flow provided by the engine fuel control sub-system, a measured turbine pressure ratio or a measured shaft speed.

6. The control system according to claim 1, wherein the one or more variable geometry components include either or both of: one or more sets of compressor variable inlet guide vanes and one or more sets of compressor bleed valves.

7. The control system according to claim 1, wherein the one or more engine constraints include any or more of: one or more compressor surge margins, one or compressor stall margins, and one or more compressor pressure ratios.

8. The control system according to claim 1, which is part of an on-board, electronic engine controller.

9. A gas turbine engine for an aircraft comprising:
a fuel flow metering valve configured to regulate a fuel flow to the gas turbine engine;
one or more variable geometry components which are movable between different set points to vary an operating configuration of the gas turbine engine; and
a control system comprising:
an engine fuel control sub-system configured to provide a fuel flow demand signal for controlling the fuel flow metering valve;
a variable geometry control sub-system configured to determine current set points to be adopted by the one or more variable geometry components given a current engine operating condition in order to comply with one or more engine constraints;
an optimiser configured to receive the current set points, determine adjusted values of the set points which optimise, while complying with the one or more engine constraints, an objective function modelling a performance characteristic of the gas turbine engine, the objective function configured to adapt to a change in engine performance with time, and adjust values of the set points, thereby generating adjusted values of the set points that account for differences between a plurality of different gas turbine engines, including the gas turbine engine, so that the adjusted values of the set points are specific to a the gas turbine engine at a given time; and
a feedback loop in which the adjusted values of the set points determined by the optimiser are configured to be sent to the variable geometry control sub-system to vary the current set points.

10. The gas turbine engine according to claim 9, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and provides an output to the fan so as to drive the fan at a lower rotational speed than the core shaft.

11. The gas turbine engine according to claim 10, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

12. A method of controlling a gas turbine engine having a fuel flow metering valve which regulates a fuel flow to the gas turbine engine, and one or more variable geometry components which are movable between different set points to vary an operating configuration of the gas turbine engine, the method including repeatedly performing the steps of: providing a fuel flow demand signal for controlling the fuel flow metering valve; determining current set points to be adopted by the one or more variable geometry components given a current engine operating condition in order to comply with one or more engine constraints; determining adjusted values of the set points which optimise, while complying with the one or more engine constraints, an objective function modelling a performance characteristic of the gas turbine engine, the objective function adapting to a change in engine performance with time; adjusting the values of the set points, thereby generating adjusted values of the set points that account for differences between a plurality of different gas turbine engines, including the gas turbine engine, so that the adjusted values of the set points are specific to the gas turbine engine at a given time; and using the adjusted values of the set points thus-determined to vary the current set points.

* * * * *